United States Patent
Alsdorf et al.

(10) Patent No.: US 6,924,319 B1
(45) Date of Patent: Aug. 2, 2005

(54) DEVULCANIZATION PRODUCT CONSISTING OF SCRAP RUBBER, A DEVULCANIZATION COMPOUND, A METHOD FOR PRODUCING SAME, THE REUSE THEREOF IN FRESH MIXTURES AND THE USE THEREOF FOR PRODUCING INJECTION MOULDED PARTS

(75) Inventors: Peter Alsdorf, Burg/Spreewald (DE); Reinhard Krieg, Lübbenau/Spreewald (DE); Günther Wenske, Liegau-Augustusbad (DE)

(73) Assignees: KET Kunststoff- und Elasttechnik GmbH, Liegau-Augustusbad (DE); Spreerelast GmbH, Vetschau (DE)

( * ) Notice: Subject to any disclaimer, the term of this patent is extended or adjusted under 35 U.S.C. 154(b) by 291 days.

(21) Appl. No.: 10/111,223

(22) PCT Filed: Oct. 21, 2000

(86) PCT No.: PCT/DE00/03734

§ 371 (c)(1), (2), (4) Date: Aug. 7, 2002

(87) PCT Pub. No.: WO01/29121

PCT Pub. Date: Apr. 26, 2001

(30) Foreign Application Priority Data

Oct. 22, 1999 (DE) .......................................... 199 50 965

(51) Int. Cl.$^7$ ............................................... C08J 11/04

(52) U.S. Cl. ............................ 521/40; 521/40.5; 521/41

(58) Field of Search ............................ 521/40, 40.5, 41

(56) References Cited

U.S. PATENT DOCUMENTS 4,305,850 A * 12/1981 Watabe et al. ............... 585/241
6,380,269 B1 * 4/2002 Benko et al. .................. 521/41

\* cited by examiner

*Primary Examiner*—Katarzyna Wyrozebski
(74) *Attorney, Agent, or Firm*—Gudrun E. Huckett

(57) ABSTRACT

A devulcanization product of comminuted scrap rubber of rubber granules, in which the sulfur bridges of the rubber granule surface are broken and activated for a new vulcanization, is produced by treating the rubber granules to swell the rubber structure of the granule surface and by mixing the treated rubber granules with a devulcanization formulation, acting mechanically and chemically reductively on the rubber granules, in a heating and cooling mixer combination. The rubber granules and the devulcanization formulation are heated to a temperature of 105–150° C. and subsequently immediately cooled. A devulcanization compound is prepared by mixing the devulcanization product with vulcanization and binding agents so as to coat the rubber granules uniformly with them The devulcanization compound can also be prepared by coating the swelled rubber granules in layers by admixing vulcanization agents such as accelerators, activators, auxiliary agents, binding agents, oxygen radical donors and scavengers.

20 Claims, No Drawings

DEVULCANIZATION PRODUCT CONSISTING OF SCRAP RUBBER, A DEVULCANIZATION COMPOUND, A METHOD FOR PRODUCING SAME, THE REUSE THEREOF IN FRESH MIXTURES AND THE USE THEREOF FOR PRODUCING INJECTION MOULDED PARTS

BACKGROUND OF THE INVENTION

1. Field of the Invention

The invention relates to a devulcanization product of scrap material of vulcanized rubber of different elastomer basis, devulcanization compounds produced therefrom, methods for their manufacture, as well as the use of the devulcanization product for utilization in fresh mixtures, and a devulcanization compound for manufacturing injection molded rubber parts.

2. Description of the Related Art

For the devulcanization of scrap rubber differently acting mechanisms and combinations thereof are used such as temperature action (thermal degradation of the rubber molecule chains), oxygen or ozone action (oxidative degradation), mechanical action, for example, in the form of strong shearing, pressing and tearing forces (mechanical degradation) and the action of chemicals (chemically reductive degradation). In each situation, energy is supplied in very different forms for cleaving the rubber and sulfur bridges. However, in all these known methods, in addition to cleaving the monosulfide or disulfide crosslinking bridges of the rubber, an extensive cracking of the C—C bonds of the macromolecules of the rubber occurs also, which inevitably results therefore also in a change of the physical and chemical parameters of the devulcanization product used as the starting material.

SUMMARY OF THE INVENTION

The object of the invention resides in the manufacture of a devulcanization product as well as of a devulcanization compound of scrap rubber which are suitable for further processing to new products without any value loss worth mentioning.

According to the invention, this object is solved by a devulcanization product of comminuted scrap rubber and a devulcanization compound produced thereof in which the comminuted scrap rubber (ground rubber, granules etc.) are devulcanized on their surface in a gentle way and are reactivated for a new vulcanization in this way. While maintaining the length of the macromolecules of the elastomer basis of the rubber as well as the properties of the starting material, the poly-sulfur, di-sulfur or mono-sulfur bridges of the rubber matrix of the surface of the comminuted scrap rubber are broken and activated for a new vulcanization.

In a further advantageous embodiment of the invention, the comminuted scrap rubber, devulcanized in a gentle way on its surface, is additionally activated by an oxygen radical donor, for example, peroxides that are conventionally used in the rubber industry. This additionally acting or parallel-occurring activation process, which is directed to act on the double bonds still present within the rubber matrix, provides further crosslinking locations for a more intensive new crosslinking and ensures thus the highest possible phase connection of the rubber granule to a fresh mixture or to different binding materials within the devulcanization compound. The formation of a weak connecting phase that is poor in acceleration agents and crosslinking agents is thus prevented, and a high physical value level is ensured.

In connection with comminuted scrap rubber, additionally activated with an oxygen radical donor and devulcanized, the scrap rubber is provided also with a radical scavenger, for example, an aging protecting agent (APA) conventional in the rubber industry. This achieves a delay effect in the vulcanization kinetics.

The devulcanization compound of the present invention is comprised of a mixture of devulcanization product according to the invention, vulcanization agent, binding agent as well as optionally technological auxiliary agents.

The devulcanization agent is sulfur. The binding agent is in the form of materials which correspond to the scrap rubber basis. For example, gas-phase EPDM is used for EPDM rubber as a binding agent and ground NR/SBR rubber is used for NR/SBR rubber as a binding agent.

For obtaining targeted vulcanization properties and vulcanization product properties, special auxiliary agents for bonding residual air or moisture are used, for example, CaO and carbon black. For obtaining the flow properties required for the injection molding process, agents for increasing flowability, for example, "Strukturol EF 44 or EF 66", or gel forming agents, for example, silicic acid and/or kaolin, are used in combination with plasticizer oil (paraffin oil) or zinc stearate.

Sulfur-crosslinked scrap rubber is used for the invention. The scrap rubber can be in the form of scrap rubber produced due to technical/technological causes but also molded rubber rejects, used tires recycled in the form of granulate or ground recycled water rubber.

According to the invention, the devulcanization product is produced such that the rubber structure of the rubber granule surface of the comminuted scrap rubber is swelled and the thus pre-treated scrap rubber is then mixed with a devulcanization formulation acting in a mechanical, chemically-reductive way, in a heating and cooling mixer combination and is heated to a temperature up to 105 to maximally 150° C. and is subsequently immediately cooled.

For swelling the rubber structure of the rubber granule surface, tall oil, plasticizer oils to be matched to the current polarity of the elastomer basis of the rubber (such as paraffin oil, aromatic, naphthenic oils etc.) and/or organic acids, for example, benzoic acid, are used. This results in a loosening of the rubber structure on the rubber granule surface and penetration of the chemicals in the subsequent method steps to a depth which is within the nano range.

In the temperature range of 105 to 150° C., the devulcanization is realized by a chemically reductive process by means of the devulcanization formulation. Heating is realized substantially by process-caused frictional heat. Preferably, heat energy is supplied up to reach a removal temperature of up to 135° C. In order to prevent a vulcanization process from occurring subsequent to the devulcanization, the chemical-reductive process is controlled such that the comminuted scrap rubber is processed within the active temperature range in a short period of time.

A further process approach is an activation process of rubber double bonds and sulfur bonds of the rubber matrix on the rubber granule surface occurring parallel or additionally to the aforementioned method and carried out by means of activatingly acting chemicals such as oxygen radical donors. For this purpose, after mixing the comminuted scrap rubber with the devulcanization formulation, oxygen radical donors are added to this mixture, and optionally radical scavengers, and mixing is continued up to the point of reaching the transfer temperature, and subsequently the mixture is cooled.

Cryogenically ground rubber (all granule sizes are possible, even pellets) is preferably employed.

The devulcanization formulation is comprised of a mixture of chemicals of vulcanization activator, vulcanization accelerator, vulcanization retarder and/or, optionally, plasticizer oil.

The vulcanization activator or vulcanization accelerator is in the form of chemicals conventionally used in the rubber industry, for example, as a vulcanization accelerator CBS, MBT/DPG, DCBS, thiuram, and as a vulcanization activator, for example, zinc oxide in combination with stearic acid or zinc stearate.

The devulcanization retarding agents are in the form of tall oil or organic acids, for example, benzoic acid.

The plasticizer oils in the case of scrap EPDM is paraffin oil.

The oxygen radical donors are peroxides conventionally used in the rubber industry. Recommended is a combination with a radical scavenger, for example, antioxidants, aging protecting agents (APA) etc, but not required in all situations.

The manufacture of the devulcanization compound according to the invention is realized either in a second mixing stage, which is separate from the manufacture of the devulcanization product, preferably in the same device, or in a single-stage process.

In a second processing stage, the devulcanization product is processed to the devulcanization compound. For this purpose, devulcanization product, vulcanization agent, binding agent as well as optionally auxiliary agents are mixed with one another such that the devulcanization granule is uniformly enclosed by the additives.

The above mentioned compounds are employed as the vulcanization agent, binding agent, as well as the optional auxiliary agents.

In addition to the two-stage process, a single-stage manufacture of the devulcanization compound is also possible. For this purpose, both processing stages devulcanization and compound mixing are combined and the actual reaction processes, i.e., the activation and devulcanization, are moved into the vulcanization process advancing with temperature. According to the invention, the rubber structure of the rubber granule surface of the comminuted scrap rubber is swelled and, subsequently, the thus pre-treated scrap rubber is coated in layers by mixing with vulcanization accelerator, vulcanization activator, vulcanization agent, auxiliary agent, binding agents, oxygen radical donor and oxygen radical scavenger.

According to the invention, a method that is gentle with respect to the elastomer structure and is based on a mechanical/chemically reductive method or a mechanical/chemically reductive and activating method is used for a defined activation temperature for producing the devulcanization products according to the invention. The thus produced devulcanization product is devulcanized and activated on the rubber granule surface. This process is possible with all sulfur-crosslinked vulcanization products. In this connection, it is important that the physical and chemical properties of the rubber starting material remain intact so that admixing of up to 50% into fresh mixture is possible without a loss of the physical parameters worth mentioning (lower than 5%) by using mixing technologies conventional in the rubber industry.

The use of a heating and cooling mixer combination ensures a precisely determined mechanical/chemically reductive process with defined heat introduction for process activation in which the rubber matrix is protected with regard to its molecule chain length against the cracking process.

In the heating and cooling mixer a relatively gentle, specially defined mechanical energy introduction into the rubber granule is provided by means of the impulse turbulence principle, primarily by friction generated between the particles or upon contact with the stirring tool. In this way, the chemically reductive or activatingly acting chemicals which cleave the sulfur bridges are processed into the rubber particle surface to a penetration depth which can be controlled in a defined way by the process parameters. Accordingly, they are positioned strategically for the task of devulcanization.

By means of the cooling mixer arranged downstream, the temperature effect can be precisely controlled temporally and, by means of the immediate quick cooling out of the active temperature range, the onset of vulcanization and a possible heat lag are prevented.

The chemicals are melted in this process and are thus distributed homogeneously within the mixture. The temperature which increases continuously in the process is generated by the friction of the particles. The mixture is cooled to its starting temperature only after the end of the process; an external heat supply is not required or controlled according to a working volume corresponding to the employed machine. In order to perform the chemically reductive process, a temperature in the range of 105–135° C. is required. The material should pass through this active temperature range preferably in 60 to 240 seconds. In this connection, the chemicals are transformed into the active state in which the sulfur chains are cleaved. The S chain cleavage is carried out in that the sulfur bridges are broken up chemically reductively and in that the accelerators with their cleavage products actively react with the two sulfur ends of the cleaved bridge. The accelerators are in the form of CBS, MBT/DPG, DCBS, thiuram, etc. During a normal vulcanization they cleave the accelerators, break the double bonds of the elastomers, and dock with the sulfur ends of the cleaved products on the free valences of the rubber. During the further course of the vulcanization they provide quickly the sulfur crosslinking of the macromolecules of the rubber in that they cleave again and quickly allow the sulfur to dock or they participate themselves in the crosslinking action.

In the process of devulcanization the chemical activation energy of the accelerator is used only for breaking the S chains. The carbon bridges of the elastomers are not attacked by this.

The length of the macromolecules of the elastomer basis of the rubber and thus also the properties of the starting material, i.e., of the original mixture, remain intact and provide a safe bonding of high proportions, up to 50%, in the fresh mixture without loss of physical values worth mentioning. This is made possible in that a direct crosslinking between the devulcanization product and the fresh mixture structure takes place.

It is known that in the vulcanization of fresh mixtures, to which untreated ground rubber of vulcanized scrap rubber has been added, a further or excess vulcanization occurs within the ground particles as a result of the temperature effect. As a result of this process, sulfur and accelerator are removed from the area immediately adjacent to the rubber granule surface and in this way the crosslinking density is greatly reduced. Accordingly, the physical parameter levels of the entire material are disturbed. The phase connection between the raw rubber/binding agent and the ground particles is not sufficiently ensured. For this reason, in the past it was possible to admix only very small amounts of ground rubber of vulcanized scrap rubber to raw rubber mixtures without loss of properties.

The aforementioned process is counteracted by adding peroxide. It gives off active oxygen radicals. In cooperation with the above mentioned devulcanization mechanism, the double bonds which are present in the rubber matrix of the recycled waste rubber are additionally activated and, in this way, the crosslinking density relative to the previously known methods is considerably increased and the above described process is prevented.

The chemically reductive process conceivably can be formulated as follows:

CBS cleavage and reaction:

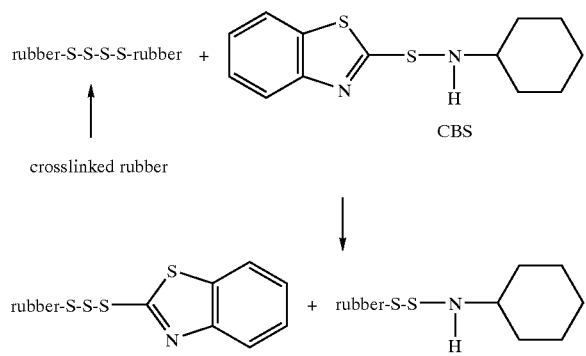

With regard to the CBS cleavage and reaction, the resulting reaction products are a mixed disulfide and a sulfenamide. No oxidation-sensitive mercaptane compounds result which is a great advantage because, until a new vulcanization begins, the active state is maintained by this bonding which counteracts an oxygen addition.

The use of tall oil with its high resin acid and fatty acid mixture proportion and organic acids (for example, organic acids such as carboxylic acids, benzoic acid) in combination with conventional plasticizer oils assist in the chemically reductive cleavage process of the sulfur bridges. The resin acid proportion acts in the new vulcanization so as to retard the vulcanization kinetics on the rubber granule surface which is important for the connection to the fresh material. It supports phase connection of the rubber granule to the bonding material. Moreover, this oil has a high tackiness which enables a layered and controlled application of the chemicals (docking) onto the rubber granule surface corresponding to the course of the process. Further processing oils (such as paraffin oil, aromatic, naphthenic oils etc.) which are to be adjusted to the present polarity of the elastomer basis of the rubber result in a loosening of the rubber structure on the rubber granule surface. This enables penetration of the chemicals to a depth which is within the nano range. In this way, the processing oils have an entraining and distribution function for the active acceleration substances and the peroxide.

A further important component for the devulcanization is zinc oxide. ZnO is an activating component for the accelerators, in combination with stearic acid during the course of the devulcanization process and during the later vulcanization process.

Stearic acid provides in combination with the accelerators a reaction potential which takes on a retarding role in the later vulcanization but in the reaction with the zinc white activatingly acting reaction products result. Also, stearic acid effects a good filler material distribution and during the injection molding process an improvement of the flow behavior.

Carbon black, silicic acid, and kaolin are used for improving the flowability as well as for air and moisture adsorption. In this way, microporosity within the vulcanization product which causes a value level decrease, is counteracted or prevented.

A decrease of the new vulcanization intensity is based on oxidative processes (addition of oxygen on the active free bonds). Aging protecting agents (APA) which counteract the oxidative rubber aging are advantageous in this process and are automatically provided in the peroxide/APA combination. In the case of cryogenically ground scrap rubber, this ground material is protected against oxygen attack by means of the nitrogen which is still present for an extended period of time, and the active bonding locations resulting from a mechanical grinding process are preserved at the same time.

Processing of the devulcanization compound can be realized in conventionally configured injection molding machines for rubber. The flowability of the material allows feeding via a hopper with stirring element. The advantage of employing the injection molding process resides particularly in that by means of the screw feed an initial compression of the material takes place and, in this way, the air which has a negative effect, for example, when using the pressing method, is almost completely removed from the raw material. The remaining amount is then bonded to carbon black.

The devulcanization compound according to the invention enables for the first time a processing of recycled scrap rubber material in an injection molding process. In this way, molded rubber parts even with complicated geometries can be produced in an effective vulcanization method. In contrast to the pressing method which has been employed until now in the processing of recycled scrap rubber for manufacturing simple shaped rubber parts such as sheets for floor coverings and similar parts, in this connection the injection molding process is recommended because already by means of the screw feed the material is initially compressed so that the air contents in the devulcanization compound is drastically reduced which is not the case in the current scrap rubber materials and the pressing method and thus leads to air inclusions and quality problems in the finished parts because the scrap rubber materials have no or only a minimal flowability and are only compressed with regard to their structure. The high injection molding pressure which is conventionally employed during the injection molding process provides a further compression of the devulcanization compound according to the invention. During the injection molding process the devulcanization compound material passes within the injection molding tool the runner distribution system and the very narrow gate (transition from the runner to the actual shaped rubber part). In the area of the gate, as is conventionally done in the injection molding process, the material experiences the highest compression, a very high shearing action and thus heating. The vulcanization process begins suddenly and is completed by the temperature of the tool over the vulcanization duration. The vulcanization speed of the devulcanization compound corresponds to the vulcanization speed of raw rubber. The excellent flow behavior of the devulcanization compound ensures the exact filling of the tool cavities, even for complicated geometries. As a result of the granular structure of the devulcanization compound, air inclusions in the injection molding process for producing shaped rubber parts present a significantly smaller problem in comparison to raw rubber. The adhesion of the shaped rubber parts of the devulcanization compound in the tool is reduced in comparison to shaped rubber parts of raw rubber which significantly facilitates removal of the shaped rubber parts from the tool. For processing the devulcanization compound all injection molding machines and injection molding tools which are usually employed for processing raw rubber can be used.

The injection molding process is carried out at high pressure (conventionally approximately 190 to 210 Mpa). As is conventional in an injection molding process, the material passes at this pressure the narrow slot within the gate area, which is slot is matched to the devulcanization product, and thus undergoes a very great shearing action. This shearing action, in particular, effects in the devulcanization compound the excellent cross-linking density for achieving average to high quality specifications of the vulcanization product, comparable to those of fresh mixtures.

DESCRIPTION OF PREFERRED EMBODIMENTS

With the aid of the following embodiments the invention will be explained in detail.

EXAMPLE 1

Manufacturing Procedure for Devulcanization Product for Manufacturing Devulcanization Compound

| | |
|---|---|
| starting material: | EPDM scrap rubber produced due to technological causes |
| comminution, particle size: | 0 to 400 μm |
| devulcanization chemicals: | CBS, tall oil, peroxide, radical scavenger |
| employed mixing device: | heating and cooling mixer combination (Hentschel company) 200 l total volume = 160 l useable volume, 65.0 kg batch weight (approximately 0.65 filling factor). |

Devulcanization batches:

| Ingredients (theoretical parts) | | |
|---|---|---|
| | formulation 1 | formulation 2 |
| ground rubber (EPDM) | 100.00 | |
| ground rubber (NR/SBR) | | 100.00 |
| tall oil | 6.00 | 14.00 |
| paraffin oil | 5.00 | |
| benzoic acid | 0.40 | |
| accelerator CBS | 2.50 | 2.50 |
| zinc oxide | 1.50 | 1.50 |
| stearic acid | 0.70 | 0.70 |

Process Control no cooling and heating adjusted the rotational speed is adjusted corresponding to the batch amount (laboratory batch 3000 rpm; production batch 600 rpm).

| working steps | temp. | time | remarks |
|---|---|---|---|
| 1. introducing ground rubber, tall oil, paraffin oil, and benzoic acid into the heating mixer | 55° C. | 0 min. | |
| 2. stirring at highest speed (600 or 3000 rpm) | | | reactivity reduction of the rubber granule |
| 3. addition of CBS, ZnO, and stearic acid | at 90° C. | | |
| 4. stirring at highest speed (600 or 3000 rpm) | | | devulcanization process |
| 5. transferring the mixture into the cooling mixer | 135° C. | 16 min. | |
| 6. cooling off the mixture in the cooling mixer | | | DV is stopped |
| 7. removal | 45° C. | 8 min. | |
| total mixing time | | 24 min. | |

EXAMPLE 2

Manufacture of the Devulcanization Compound

| Ingredients (theoretical parts) | | |
|---|---|---|
| | formulation 1 | formulation 2 |
| devulcanization prod. formulation 1 | 100.00 | |
| devulcanization prod. formulation 2 | | 100.00 |
| gas phase EPDM 80% (binding agent) | 9.50 | |
| carbon black (binding agent for air) | | 0.40 |
| NR powder or NR latex (binding agent) | | 6.00 |
| ground sulfur (vulcanization agent) | 1.50 | 2.00 |
| peroxide 98% (oxygen radical donor) | 1.00 | 1.00 |
| aging protecting agent (radical scavenger) | 0.10 | 0.10 |

Process control no cooling and heating adjusted if not indicated differently, the rotational speed is adjusted corresponding to the batch amount (laboratory batch 3000 rpm; production batch 600 rpm).

| working steps | temp. | time | remarks |
|---|---|---|---|
| 1. introducing devulcanization product of formulation 1 or formulation 2 and sulfur into the heating mixer | appr. 55° C. | 0 min. | |
| 2. stirring at highest speed (600 or 3000 rpm) | | | docking of sulfur on the rubber granule surface |
| 3. addition of binding agents, kaolin, silicic acid and flowability increasing agent | at 70° C. | | |
| 4. stirring at medium speed (600 or 1500 rpm) | | | mixing/distributing |
| 5. adding peroxide and APA | at 80° C. | | |
| 6. stirring at medium speed (600 or 1500 rpm) | | | mixing/distributing/docking |
| 7. transferring the mixture into the cooling mixer | at 95° C. | 10 min. | |

-continued

| working steps | temp. | time | remarks |
|---|---|---|---|
| 8. cooling the mixture in the cooling mixer | | | |
| 9. Removal | 45° C. | 6 min. | reaching packaging temperature |
| total mixing time | | 16 min. | |

Characterization of the Devulcanization Compounds

The devulcanization compound is similar to the devulcanization product with respect to visual appearance and behavior. As a result of the flowability which has been maintained, a direct feeding by means of hoppers into an injection molding apparatus is ensured, providing technological advantages.

In the following the physical test results of the EPDM rubber devulcanization compound, manufactured according to the above formulation and method, are illustrated.

| physical parameters | values (basis EPDM) | | unit | standard |
|---|---|---|---|---|
| | NOMINAL | ACTUAL | | |
| hardness | 50 +/- 5 | 50 | Shore A | DIN 53 505 |
| hardness after aging in air 168 h/70° C. | +10 | +10 | Shore A | DIN 53 508 |
| tensile strength | minimum 7.0 | 12.2 | N/mm² | DIN 53 504 |
| tensile strength after aging in air 168 h/70° C. | up to −25% | −8.8% | N/mm² | DIN 53 508 |
| strain at failure | minimum 400 | 700 | % | DIN 53 504 |
| strain at failure after aging in air 168 h/70° C. | up to −35% | −28% | % | DIN 53 508 |
| compression set | <50 | 34 | % | DIN 53 517 |
| rebound resilience | — | 40 | % | DIN 53 512 |
| wear | — | 249 | mm² | DIN 53 516 |
| lacquer indifference | slight CD permissible | slight CD | contact discoloration | N 3810 |
| laquer indifference | no CF permissible | no CF | corona formation | N 3810 |
| lacquer indifference | no WOE permissible | no WOE | wash-out effect | N 3810 |
| ozone resistance (2 ppm, 25° C., 48 h) | no cracks | no cracks | | DIN 53509 |
| cold resistance (after 24 h cold storage at −40° C.) | no cracks | no cracks | | |
| insulation resistance | >10 to the 8th | >10 to the 8th | Ohm | N 67019 DIN 53482 |
| tear strength | test body B (6.3 +/− 0.3 mm) | 8.5 | N/mm | DIN 53 507 |
| PMMA indifference | no cracks permissible | no cracks | | N 38016 |
| PC indifference | no cracks permissible | no cracks | | N 38016 |
| remark: test body was vulcanized for 10 minutes at 158° C.! | | | | |

| physical parameters | nominal values | ACTUAL values, basis: NR/SBR (used tires) | unit | standard |
|---|---|---|---|---|
| hardness | — | 65 (60–90) | Shore A | DIN 53 505 |
| tensile strength | — | 11.00 | N/mm² | DIN 53 504 |
| elongation at tear | — | 340 | % | DIN 53 504 |
| compression set (CS) | — | 20 | % | DIN 53 517 |
| rebound resilience | — | 50 | % | DIN 53 512 |
| wear | — | 249 | mm² | DIN 53 516 |

The EPDM devulcanization compound was subjected to a xenon rapid aging test according to VW test standard 3930 at the following conditions:

1. time 1600 hours
2. parallel running
3. Schwarzstandard temperature 65° C.
4. 102:18 rain
5. relative humidity 60–80%
6. radiation intensity 60 W/m²

Test results:
heating time of the test body 10 minutes
visual appearance of the surface no cracks, carbon black has migrated distributor: no cracks, carbon black migrated

| | before | after | deviation |
|---|---|---|---|
| strength (N/mm²) | 9.0 | 7.3 | −18.9% |
| rebound resilience (%) | 700 | 570 | −18.6% |
| extension (%) | 44 | 42 | −4.6% |
| hardness (Shore A) | 49 | 54 | +10.2% |

EXAMPLE 3

Preparation of Devulcanization Product for Fresh Mixture

| starting material: | EPDM scrap rubber produced by technological causes |
|---|---|
| comminution, particle size: | 0 to 400 μm |
| devulcanization chemicals: | CBS, tall oil, peroxide, radical scavenger |
| employed mixing device: | heating and cooling mixer combination (Hentschel company) 240 l total volume = 160 useable volume, 65.0 kg batch weight (appr. 0.65 filling factor) |

Devulcanization batches:

| Ingredients (theoretical parts) | | |
|---|---|---|
| | formulation 1 | formulation 2 |
| ground rubber (EPDM) | 100.00 | |
| ground rubber (NR/SBR) | | 100.00 |
| tall oil | 6.00 | 14.00 |

-continued

| Ingredients (theoretical parts) | | |
|---|---|---|
| | formulation 1 | formulation 2 |
| paraffin oil | 5.00 | |
| benzoic acid | 0.40 | |
| accelerator CBS | 2.50 | 2.50 |
| zinc oxide | 1.50 | 1.50 |
| stearic acid | 0.70 | 0.70 |
| dicumyl peroxide (98%) | 1.00 | 1.00 |
| IPPD | 0.10 | 0.10 |
| carnauba wax | 2.00 | 2.00 |

Process control no cooling and heating adjusted if not noted otherwise, the rotational speed is adjusted corresponding to the batch amount (laboratory batch 3000 rpm; production batch 600 rpm).

| working steps | temp | time | remarks |
|---|---|---|---|
| 1. feeding ground rubber, oils, and benzoic acid into the heating mixer | at 55° C. | 0 min. | |
| 2. stirring at highest speed (600 or 3000 rpm) | | | reactivity reduction of the rubber granules loosening of the rubber surface |
| 3. addition of CBS, ZnO, SA, kaolin, and stearic acid | at 65° C. | | |
| 4. stirring at highest speed (600 or 3000 rpm) | | | docking |
| 5. then addition of peroxide | 80° C. | | |
| 6. slow stirring (600 rpm) | | | docking |
| 7. then addition of IPPD | 90° C. | | |
| 8. slows stirring (600 rpm) | | | docking |
| 9. addition of carnauba wax | 100° C. | | |
| 10. very slow stirring (600 rpm) | | | docking |
| 11. transfer into the COOLING MIXER | appr. 115° C. | 10 min. | |
| 12. cooling the mixture in the cooling mixer | | | reaction is stopped |
| 13. removal | 45° C. | 6 | |
| total mixing time | | 16 min. | |

Characterization of the Devulcanization Product

A flowable product results which has a reduced inherent tackiness. This tackiness of the particles relative to one another results in a typical recognition pattern of the devulcanization product which is characterized by delayed flow ("crawling") during pouring processes. For improving the flowability and pouring properties of the material, a significant improvement is achieved with 0.5 to 1.0 part highly dispersed hydrophilic silicic acid and/or kaolin. Moreover, possibly present humidity is bonded.

In the following, the results of a test series of EPDM rubber devulcanization product, manufactured according the above formulation and method, are provided in a direct comparison as a blend component in an EPDM fresh mixture with increasing proportion.

| | blend variants | | | |
|---|---|---|---|---|
| physical parameters | V80/20 (test mixture/DV) | 16/40 (test mixture/DV) | 40/60 (test mixture/DV) | 100 (test mixture-basis) |
| breaking strength (MPa) | 6.76 | 6.62 | 5.67 | 5.73 |
| strain at failure | 363 | 378 | 377 | 334 |
| hardness (° Shore A) | 82.4 | 60.6 | 57.8 | 60.6 |
| rebound resilience (%) | 34.1 | 36.2 | 35.53 | 31.67 |
| rheological tests (180° C.) | | | | |
| ML | 9.0 | 9.6 | 11.0 | 7.8 |
| TS2 | 01:17 | 01:21 | 01:39 | 01:43 |
| T50 | 02:11 | 02:20 | 02:47 | 02:52 |
| T90 | 06:08 | 06:59 | 08:11 | 07:13 |
| MH | 28.5 | 25.7 | 24.2 | 24.2 |
| RH | 0.16 | 0.12 | 0.07 | 0.1 |
| TRH | 01:47 | 01:52 | 02:07 | 02:28 |
| TPU | 159.8 | 159.8 | 161.0 | 159.8 |
| TPL | 159.9 | 180.0 | 159.4 | 159.9 |
| | test body | T = 180° C. D = 6 mm | HT = 20 min | P 95 bar |

EXAMPLE 4

Manufacturing Procedure for Single-stage DVC

It is possible to produce the devulcanization compound in a single stage. In this method, the DV proportion is combined with the DVC proportion in a mixing process and the reaction mechanism of the devulcanization and activation of the double bond is carried out during the course of the vulcanization process of the DVC.

A decisive factor in this connection is a layered application of the individual mixing components during manufacture.

| starting material: | EPDM scrap rubber produced by technological causes |
|---|---|
| comminution, particle size: | 0 to 400 μm |
| employed mixing device: | heating and cooling mixer combination (Hentschel company) 200 l total volume = 160 useable volume, 65.0 kg batch weight (appr. 0.65 filling factor) |

Batches:

| Ingredients (theoretical parts) | | |
|---|---|---|
| | formulation 1 | formulation 2 |
| ground rubber (EPDM) | 100.00 | |
| ground rubber (NR/SBR) | | 100.00 |
| tall oil | 6.00 | 14.00 |
| paraffin oil | 5.00 | |
| benzoic acid | 0.40 | |
| accelerator CBS | 2.50 | 2.50 |
| zinc oxide | 1.50 | 1.50 |
| stearic acid | 0.70 | 0.70 |
| gas-phase EPDM 80% (binding agent) | 9.5 | |
| carbon black (binding agent for air) | | 0.40 |
| NR powder or NR latex (binding agent) | | 6.00 |

-continued

| Ingredients (theoretical parts) | | |
|---|---|---|
| | formulation 1 | formulation 2 |
| ground sulfur (vulcanization agent) | 1.50 | 2.00 |
| peroxide 98% (oxygen radical donor) | 1.00 | 1.00 |
| aging protecting agent IPPD (radical scavenger) | 0.10 | 0.10 |

Process control

| | working steps | temp | time | remarks |
|---|---|---|---|---|
| 1. | feeding ground rubber, oils, and benzoic acid into the heating mixer | appr. 50° C. | 0 min. | |
| 2. | stirring at highest speed (600 or 3000 rpm) | | | reactivity reduction of the rubber granules loosening of the rubber surface |
| 3. | addition of accelerator (CBS), ZnO, and stearic acid | appr. 65° C. | | |
| 4. | stirring at highest speed | | | docking |
| 5. | addition of sulfur | appr. 70° C. | | |
| 6. | stirring at highest speed (600 or 3000 rpm) | | | docking |
| 7. | addition of kaolin and silicic acid | appr. 75° C. | | |
| 8. | stirring at highest speed (600 rpm or 3000 rpm) | | | docking |
| 9. | addition of binding agent | appr. 85° C. | | |
| 10. | slow stirring (1500 or 600 rpm) | | | docking |
| 11. | addition of peroxide and APA | appr. 88° C. | | |
| 12. | slow stirring (1500 or 600 rpm) | | | docking |
| 13. | transfer into the COOLING MIXER | appr. 90° C.–95° C. | 15 min. | |
| 14. | cooling the mixture in the cooling mixer | | | reaction is stopped |
| 15. | removal | appr. 45° C. | 8 | |
| total mixing time | | | 23 min. | |

EXAMPLE 5

On the basis of the devulcanization product of scrap EPDM and raw rubber injection molded parts are produced according to the following conditions and compared with one another:

| | starting material devulcanization compound of scrap EPDM | starting material raw rubber |
|---|---|---|
| manufacture of housings | | |
| injection molding machine Werner & Pfleiderer GSP 400 VU | | |
| injection molding tool with six cavities | | |
| point runner diameter 2.5 mm | | |
| shot weight | 2780 g | 3150 g |
| screw/cylinder temperature | 65° C. | 65° C. |
| tool temperature | 165° C. | 175° C. |
| injection time | 40 sec. | 40 sec. |
| injection pressure | 1080 bar | 1080 bar |
| vulcanization duration | 350 sec | 350 sec |
| evaluation of parts | o.k. | o.k. |

List of Abbreviations Used:

| | |
|---|---|
| APA | aging protecting agent |
| CBS (accelerator) | N-cyclohexyl-2-mercapto benzothiozolyl-sulfenamide |
| DCBS (accelerator) | di-cyclohexyl-2-mercapto benzothiozolyl-sulfenamide |
| DPG | diphenyl guanidine (accelerator) |
| CS | compression set |
| EPDM | ethylene propylene terpolymer (synthetic rubber) |
| IPPD | N-isopropyl-N'-phenyl-p-phenylene diamine (APA, e.g. "4010 NA") |
| SA | silicic acid |
| MBT | 2-mercapto benzthiazol (accelerator) |
| NR | natural rubber (natural caoutchouc) |
| SBR | styrene-butadiene-rubber (synthetic rubber) |
| thiuram | tetramethylene thiuram disulfide (accelerator) |
| vulcanization retarder | e.g. benzoic acid |

Test results

| | |
|---|---|
| ML | low Mooney (lowest plasticity or tensile stress) |
| TS2 | vulcanization time after two units of tensile stress increase above minimum |
| T50 | vulcanization time for 50% of the total tensile stress increase |
| T90 | vulcanization time for 90% of the total tensile stress increase |
| MH | high Mooney (highest tensile stress of the rubber) |

What is claimed is:

1. A devulcanization product of comminuted scrap rubber comprised of rubber granules, in which devulcanization product sulfur bridges of the granule surface of the rubber granules are broken and activated for a new vulcanization, the devulcanization product produced by,
   treating the rubber granules to swell a rubber structure of the granule surface of the rubber granules;
   admixing a chemically reductive devulcanization formulation to the rubber granules with the swelled rubber structure;
   acting mechanically on the rubber granules in a heating and cooling mixer combination and allowing the devulcanization formulation to cleave chemically reductively sulfur bridges of the granule surface, while the rubber granules and the devulcanization formulation reach a transfer temperature of 105° C. to 150° C.; and
   subsequently immediately cooling the rubber granules and the devulcanization formulation.

2. The devulcanization product according to claim 1, wherein the devulcanized scrap rubber is additionally activated with an oxygen radical donor.

3. The devulcanization product according to claim 2, wherein the oxygen radical donor is a peroxide.

4. The devulcanization product according to claim 2, wherein the devulcanized and additionally activated scrap rubber is provided with a radical scavenger.

5. A devulcanization compound comprised of a mixture of the devulcanization product according to claim 1, a vulcanization agent, and a binding agent.

6. A devulcanization compound according to claim 5, further comprising an auxiliary agent.

7. A method for producing a devulcanization product of comminuted scrap rubber, comprising the steps of:
   treating the rubber granules to swell a rubber structure of the granule surface of the rubber granules;
   admixing a chemically reductive devulcanization formulation to the rubber granules with the swelled rubber structure;
   acting mechanically on the rubber granules in a heating and cooling mixer combination and allowing the devulcanization formulation to cleave chemically reductively sulfur bridges of the granule surface, while the rubber granules and the devulcanization formulation reach a transfer temperature of 105° C. to 150° C.; and
   subsequently immediately cooling the rubber granules and the devulcanization formulation.

8. The method according to claim 7, wherein, in the step of treating, at least one compound of the group consisting of tall oil, a plasticizer oil, matched to the present polarity of the elastomer basis of the scrap rubber, and an organic acid is used.

9. The method according to claim 8, further comprising the step of adding an oxygen radical donor to the rubber granules and the devulcanization formulation before the transfer temperature is reached.

10. The method according to claim 9, further comprising the step of adding a radical scavenger before the transfer temperature is reached.

11. The method according to claim 9, wherein the devulcanization formulation is comprised of a mixture of a vulcanization activator, a vulcanization accelerator, and a vulcanization retarder.

12. The method according to claim 11, wherein the devulcanization formulation further comprises a plasticizer oil.

13. The method according to claim 11, wherein the vulcanization accelerator is CBS (N-cyclohexyl-2-mercapto benzothiozolyl-sulfenamide) or MTB/DPG (2-mercapto benzthiazol/diphenyl guanidine) or DCBS (di-cyclohexyl-2-mercapto benzothiozolyl-sulfenamide) or thiuram and the vulcanization activator is zinc stearate or zinc oxide in combination with stearic acid.

14. The method according to claim 11, wherein the vulcanization retarder is tall oil or organic acids.

15. The method according to claim 10, wherein the oxygen radical donor is a peroxide.

16. The method according to claim 15, wherein the peroxide is used in combination with a radical scavenger.

17. A method for manufacturing a devulcanization compound, comprising the step of:
   mixing a devulcanization product according to claim 1 with a vulcanization agent and a binding agent so as to coat the devulcanized rubber granules uniformly with the vulcanization agent and the binding agent.

18. The method according to claim 17, wherein an auxiliary agent is added in the step of mixing.

19. A method for preparing a rubber mixture for vulcanization, comprising the steps of:
   providing a raw rubber mixture; and
   adding the devulcanization product according to claim 1 to the raw rubber mixture.

20. A method for manufacturing injection molded rubber parts, comprising the steps of:
   mixing a devulcanization product according to claim 1 with a vulcanization agent and a binding agent so as to coat the devulcanized rubber granules uniformly with the vulcanization agent and the binding agent to produce a devulcanization compound; and
   injection molding the devulcanization compound.

* * * * *